(12) United States Patent
Baek et al.

(10) Patent No.: US 9,397,790 B2
(45) Date of Patent: Jul. 19, 2016

(54) SYSTEM AND METHOD FOR UNIDIRECTIONAL DATA TRANSMISSION

(71) Applicant: KOREA ELECTRIC POWER CORPORATION, Seoul (KR)

(72) Inventors: Jong Mock Baek, Daejeon (KR); Moon Suk Choi, Daejeon (KR); Chung Hyo Kim, Daejeon (KR); Yeop Chang, Daejeon (KR); Byung Gil Min, Cheongju-si (KR); Woo Nyon Kim, Daejeon (KR); Moon Su Jang, Daejon (KR); Jeong Han Yun, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 0 days.

(21) Appl. No.: 14/418,929

(22) PCT Filed: Sep. 16, 2013

(86) PCT No.: PCT/KR2013/008375
§ 371 (c)(1),
(2) Date: Jan. 30, 2015

(87) PCT Pub. No.: WO2014/046442
PCT Pub. Date: Mar. 27, 2014

(65) Prior Publication Data
US 2015/0215075 A1    Jul. 30, 2015

(30) Foreign Application Priority Data
Sep. 20, 2012 (KR) .................. 10-2012-0104827

(51) Int. Cl.
*G06F 7/04* (2006.01)
*H04L 1/16* (2006.01)
(Continued)

(52) U.S. Cl.
CPC ............ *H04L 1/1607* (2013.01); *H04L 1/1621* (2013.01); *H04L 49/552* (2013.01); *H04L 63/0209* (2013.01); *H04L 63/105* (2013.01); *H04L 63/123* (2013.01); *H04L 63/18* (2013.01)

(58) Field of Classification Search
None
See application file for complete search history.

(56) References Cited

U.S. PATENT DOCUMENTS 7,555,653 B2    6/2009  Sueyoshi et al.
7,869,428 B2    1/2011  Shake et al.
(Continued)

FOREIGN PATENT DOCUMENTS

JP    4742498 B2    7/2005
JP    4074304 B2    6/2006
(Continued)

OTHER PUBLICATIONS

International Search Report issued in International Application No. PCT/KR2013/008375 with Date of mailing Oct. 24, 2013, with English Translation.

*Primary Examiner* — Brandon Hoffman
(74) *Attorney, Agent, or Firm* — McDermott Will & Emery LLP

(57) ABSTRACT

The present invention relates to a system and method for unidirectional data transmission. Data is unidirectionally transmitted from a network having a higher security level to a network having a lower security level and a corresponding data verification result is received through a separate line. Hence, it is possible not only to physically block access to the network having a higher security level from the network having a lower security level but also to improve reliability of data delivery by appropriately handling packet loss and bit errors that may occur during data transmission.

18 Claims, 5 Drawing Sheets

(51) Int. Cl.
*H04L 29/06* (2006.01)
*H04L 12/939* (2013.01)

(56) References Cited

U.S. PATENT DOCUMENTS

| | | | |
|---|---|---|---|
| 7,941,670 B2 | 5/2011 | Sueyoshi et al. | |
| 2004/0111524 A1 | 6/2004 | Namioka et al. | |
| 2005/0033990 A1* | 2/2005 | Harvey | H04L 63/105 |
| | | | 726/4 |
| 2005/0198514 A1 | 9/2005 | Sueyoshi et al. | |
| 2006/0026292 A1 | 2/2006 | Namioka et al. | |
| 2008/0267080 A1* | 10/2008 | Sultan | H04L 12/2697 |
| | | | 370/248 |
| 2008/0279181 A1 | 11/2008 | Shake et al. | |
| 2009/0235336 A1 | 9/2009 | Sueyoshi et al. | |
| 2011/0038373 A1 | 2/2011 | Shake et al. | |

FOREIGN PATENT DOCUMENTS

| | | |
|---|---|---|
| JP | 3900058 B2 | 4/2007 |
| KR | 10-2000-0028706 A | 5/2000 |
| KR | 10-2004-0028571 A | 4/2004 |
| KR | 10-2011-0004248 A | 1/2011 |
| KR | 10-2011-0040004 A | 4/2011 |

* cited by examiner

SYSTEM AND METHOD FOR UNIDIRECTIONAL DATA TRANSMISSION

RELATED APPLICATIONS

This application is a national phase of International Application No. PCT/KR2013/008375, filed on Sep. 16, 2013, which in turn claims the benefit of Korean Application No. 10-2012-0104827, filed on Sep. 20, 2012, the disclosures of which applications are incorporated by reference herein.

TECHNICAL FIELD

The present invention relates to a system and method for unidirectional data transmission and, in particular, to a system and a method for unidirectional data transmission wherein data is unidirectionally transmitted from a network having a higher security level to a network having a lower security level and a corresponding data verification result is received through a separate line so as to physically block access to the network having a higher security level from the network having a lower security level while improving reliability of data transmission.

BACKGROUND ART

In systems requiring a high level of security such as defense, control or financial systems, utilization of unidirectional data transmission technology may provide necessary information to the outside while securing the internal system from external attacks.

However, when a purely unidirectional system is physically deployed, as recovery from packet loss or bit errors is not easy, it is difficult to ensure reliability of transmitted data.

To ensure reliability, when a first network having a higher security level sends data to a second network having a lower security level, the second network may have to send a response corresponding to the data to the first network. In this case, as communication becomes bidirectional, a possibility of intrusion into the first network is generated. Hence, it is necessary to have a secure scheme that can not only block an attack in the reverse direction but also ensure reliability of data.

To improve reliability, a self error recovery algorithm may be used. However, in this case, data may be lost when a packet is lost or an unrecoverable error occurs. To send a reception indication from the second network to the first network, a separate signaling channel with limited information capability may be employed. In this case, when a signal is sent from the second network to the first network, it is not easy to identify whether the signal is a response corresponding to data having been sent by the first network because the signal carries insufficient information, making it difficult to secure reliability of data transmission.

In data transmission from a first network requiring a higher security level to a second network requiring a lower security level, when the meaningful flow of data is purely unidirectional, it is possible to protect the first network from all threats coming through a connection point with the second network by use of a unidirectional data diode that unidirectionally transfers physical data from the second network to the first network. However, an error may occur during unidirectional data transmission using such a data diode although the probability of error occurrence is low due to characteristics of communication media.

A related art scheme using forward error correction for error detection and correction is disclosed in Korean Patent Publication No. 10-2000-0028706 (2000-05-25) entitled "Method and Device For Establishing Secure Connection On Unidirectional Data Path".

DISCLOSURE

Technical Problem

However, such a scheme using forward error correction may fail when errors exceeding the recovery capability occur or data loss occurs. When a separate signaling channel is used to transmit limited information only (e.g. signal '1' when reception is successful and signal '0' when reception is unsuccessful), it may be difficult to determine whether a signal received from the second network is a response corresponding to data having been sent by the first network or is a value generated by an abnormal event owing to insufficient information, compromising reliability of data transmission.

Accordingly, to address the above mentioned problems or disadvantages, it is an aspect of the present invention to provide a system and method for unidirectional data transmission wherein data is unidirectionally transmitted from a network having a higher security level to a network having a lower security level and a corresponding data verification result is received through a separate line so as to physically block access to the network having a higher security level from the network having a lower security level while improving reliability of data transmission.

Technical Solution

In accordance with one aspect of the present invention, a system for unidirectional data transmission includes: a transmitter that is connected to a first network having a higher security level, sends data coming from the first network through a data transmission line to a second network having a lower security level, and receives a data verification result (DVR) corresponding to the data through a DVR transmission line; and a receiver that is connected to the second network having a lower security level, receives data from the transmitter through the data transmission line and forwards the received data to the second network, and sends a DVR corresponding to the received data through the DVR transmission line.

The transmitter may include: a transmit data buffer to store data received from the first network; a data transmit module to send data stored in the transmit data buffer via a data transmit port to the data transmission line; a DVR receive module to receive a DVR via a DVR receive port through the DVR transmission line; a first DVR check module to examine the format of a DVR received by the DVR receive module; and a first DVR memory to store the received DVR according to the result of checking by the first DVR check.

The data transmit module may determine to send the next data or to resend the previous data according to the status of the DVR stored in the first DVR memory.

The first DVR check module may be granted write-only permission for the first DVR memory and the data transmit module may be granted read-only permission for the first DVR memory.

The transmitter may be connected with the first network so that data can flow only from the first network to the transmitter.

The receiver may include: a data receive module to receive data through a data receive port from the data transmission line; a receive data buffer to store data received by the data receive module and forward the stored data to the second network; a second DVR memory to store a DVR as a result of verification of data received by the data receive module; a second DVR check module to examine the format of the DVR stored in the second DVR memory; and a DVR transmit module to send the DVR through a DVR transmit port to the DVR transmission line in accordance with the result produced by the second DVR check module.

The data receive module may be granted write-only permission for the second DVR memory and the second DVR check module may be granted read-only permission for the second DVR memory.

The receiver may be connected with the second network so that data can flow only from the receiver to the second network.

A data packet to be sent through the data transmission line may be composed of a Group ID field to store a unique value of a data packet group, a Packet Count field to indicate a packet to be sent in the data packet group, a Seq field to indicate the sequence of the packet to be sent in the data packet group, a Unique Value field to store a unique value used to distinguish each packet transmission, a Data field to store actual data to be sent, and an HV field to store a hash value of the data packet.

A DVR packet to be sent through the DVR transmission line may be composed of a Group ID field to store a unique value indicating a corresponding data packet group, a Unique Value field to store a unique value used to distinguish each packet transmission, and a Signal field to store the analysis result of received data.

In accordance with another aspect of the present invention, a method for unidirectional data transmission includes: checking, by a transmitter, whether a data transfer condition is satisfied; sending data through a data transmission line, when the data transfer condition is satisfied; checking whether a data verification result (DVR) is received within a preset time after data transmission through a DVR transmission line; determining whether to resend the data depending upon the status of the DVR; and resending the data with a modified UV value for packet discrimination or storing the DVR according to the result of determination.

The data transfer condition may correspond to the status of the DVR or to presence of data to be sent in a transmit data buffer.

Determining whether to resend the data may include: checking whether the DVR is received within a preset time; checking whether the received DVR conforms to a predefined format and value; checking whether the received DVR indicates success of verification; and checking whether the received DVR has the same Group ID and UV value as the corresponding data packet.

In accordance with another aspect of the present invention, a method for unidirectional data transmission may include: receiving data through a data transmission line by a receiver; checking whether a data packet is normally received; storing a data verification result (DVR) corresponding to the result of normal reception checking; and examining the stored DVR and sending the same through a DVR transmission line.

Checking whether a data packet is received normally may include: examining whether all packets of the data packet are received within a preset time; and examining whether a hash value of the data packet is identical to a computed hash value.

Advantageous Effects

According to the present invention, data is unidirectionally transmitted from a network having a higher security level to a network having a lower security level and a corresponding data verification result is received through a separate line. Hence, it is possible not only to physically block access to the network having a higher security level from the network having a lower security level but also to improve reliability of data transmission by appropriately handling packet loss and bit errors that may occur during data transmission.

BEST MODE

Figure 1:
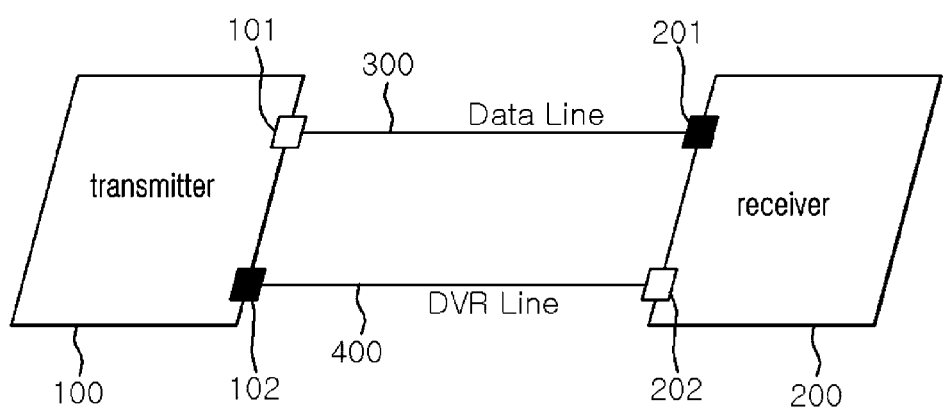
FIG. 1 is a conceptual diagram of a unidirectional data transmission system according to one embodiment of the present invention.

Hereinafter, embodiments of the present invention will be described in detail with reference to the accompanying drawings. In the drawings, some elements are exaggerated or only outlined in brief for clarity of description, and thus may not be drawn to scale. Particular terms may be defined to describe the present invention in the best manner. Accordingly, the meaning of specific terms or words used in the specification and the claims should not be limited to the literal or commonly employed sense, but should be construed in accordance with the spirit of the present invention.

FIG. 1 is a conceptual diagram of a unidirectional data transmission system according to one embodiment of the present invention.

As shown in FIG. 1, a transmitter 100 and a receiver 200 are connected through two separate communication lines. Communication connections are established through a data transmission line 300 for data transfer and a data verification result (hereinafter referred to as "DVR") transmission line 400 for DVR transfer.

The transmitter 100 includes a data transmit port 101 and a DVR receive port 102. The data transmit port 101 may be used only to transmit data, and the DVR receive port 102 may be used only to receive a DVR.

The receiver 200 includes a data receive port 201 and a DVR transmit port 202. The data receive port 201 may be used only to receive data, and the DVR transmit port 202 may be used only to send a DVR.

In the case of optical communication, transmit ports may be implemented using optical output terminals and receive ports may be implemented using photoelectric cells. Such transmit ports and receive ports may be implemented by removing reception lines from serial or UTP cables.

To improve reliability of unidirectional data transmission, when the transmitter 100 sends a packet to the receiver 200 through the data transmission line 300, the receiver 200 sends a DVR indicating packet reception status through the DVR transmission line 400 to the transmitter 100. Hence, it is possible to detect occurrence of a packet error or bit error between the transmitter 100 and the receiver 200 and to perform retransmission, increasing reliability of unidirectional data delivery.

Figure 2:
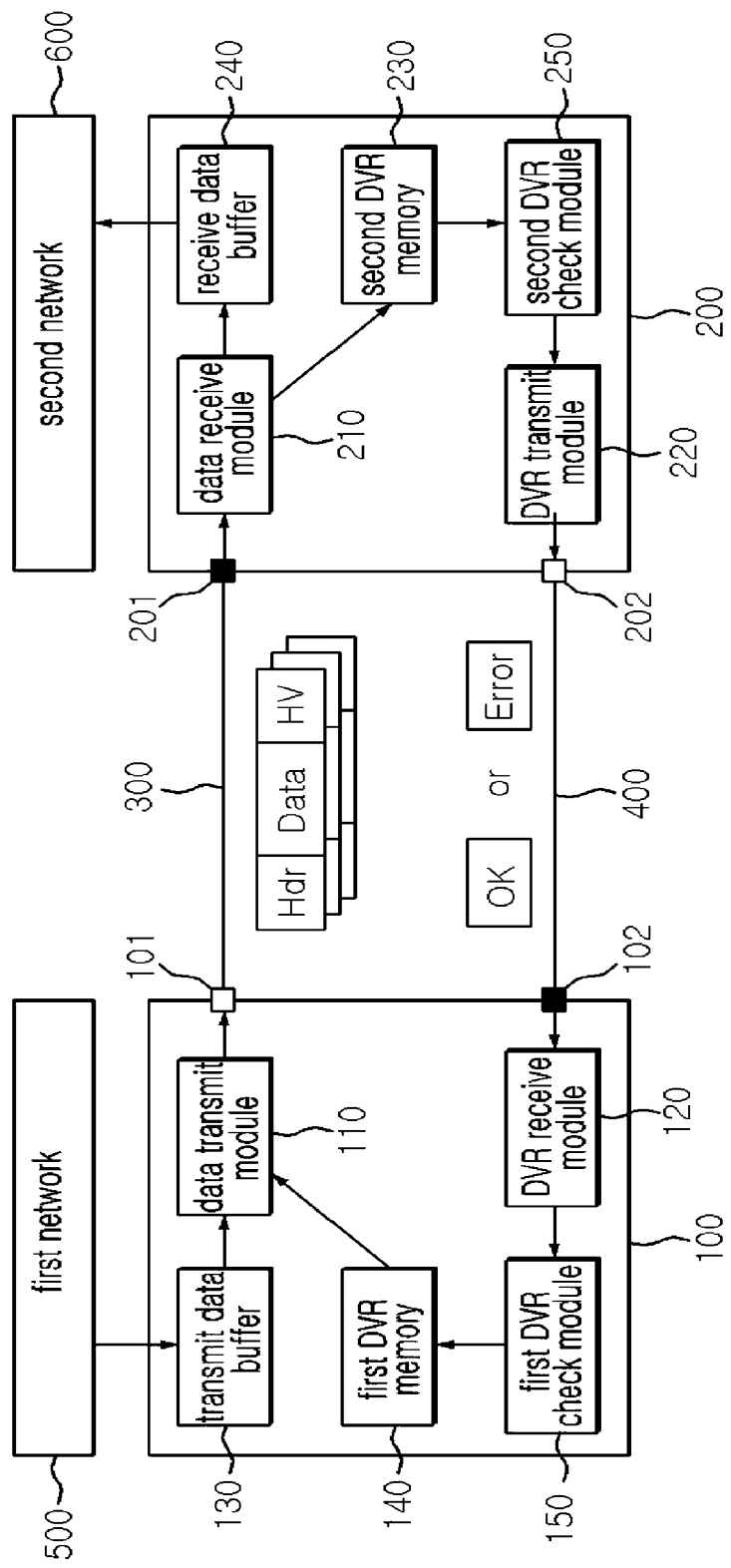
FIG. 2 is a block diagram of a detailed configuration of the unidirectional data transmission system according to the embodiment of the present invention.

FIG. 2 is a block diagram of a detailed configuration of the unidirectional data transmission system according to the embodiment of the present invention.

As shown in FIG. 2, the transmitter 100 is connected to a first network 500 having a higher security level and sends data coming from the first network 500 through the data transmission line 300 to a second network 600 having a lower security level, and receives a DVR corresponding to the data through the DVR transmission line 400.

Specifically, the transmitter 100 includes a transmit data buffer 130, a data transmit module 110, a DVR receive module 120, a first DVR check module 150, and a first DVR memory 140.

The transmit data buffer 130 stores data received from the first network 500.

Here, the transmit data buffer 130 is interfaced so that the transmit data buffer 130 may only store data received from the first network and information thereof cannot be read by the first network 500.

As such, data can only be sent from the first network 500 to the transmitter 100 and access to the first network 500 having a high security level is blocked.

The data transmit module 110 sends a data packet through the data transmit port 101 to the data transmission line 300 each time that data is stored in the transmit data buffer 130.

The data transmit module 110 sends next data when the DVR stored in the first DVR memory 140 indicates successful transmission of the previous data (OK), and resends the previous data when the DVR indicates error occurrence.

The DVR receive module 120 receives a DVR through the DVR receive port 102 from the DVR transmission line 400.

The first DVR check module 150 examines whether a DVR received by the DVR receive module 120 conforms to a preset format.

The first DVR memory 140 stores a received DVR according to the DVR check result from the first DVR check module 150.

Here, the first DVR check module 150 is granted write-only permission for the first DVR memory 140 and the data transmit module 110 is granted read-only permission for the first DVR memory 140.

As described above, the data transmit module 110 and the DVR receive module 120 are only allowed to exchange data through the first DVR memory 140, and the first DVR check module 150 is only allowed to write to the first DVR memory 140 and the data transmit module 110 is only allowed to read from the first DVR memory 140. Hence, the individual modules are allowed to operate independently.

In addition, the first DVR memory 140 is only allowed to store DVR information of a small fixed size, preventing a possibility of cyber attack through the first DVR memory 140.

As described above, in the transmitter 100, each time that data is stored in the transmit data buffer 130, the data transmit module 110 sends data and waits for a given time until a DVR corresponding to the sent data is stored in the first DVR memory 140. When a DVR arrives at the DVR receive port 102, the DVR receive module 120 examines whether the received DVR matches a given data format by use of the first DVR check module 150 and stores the examined DVR in the first DVR memory 140.

Thereafter, the data transmit module 110 identifies whether data transmission is successful on the basis of the value written in the first DVR memory 140, and determines whether to send the next data or resend the previous data.

The receiver 200 connected to the second network 600 having a lower security level receives data from the transmitter 100 through the data transmission line 300, forwards the received data to the second network 600, and sends a DVR corresponding to the received data through the DVR transmission line 400.

Specifically, the receiver 200 includes a data receive module 210, a receive data buffer 240, a second DVR memory 230, a second DVR check module 250, and a DVR transmit module 220.

The data receive module 210 receives data through the data receive port 201 from the data transmission line 300.

Here, the data receive module 210 analyzes received data packets to detect occurrence of an error such as packet loss or bit error, discards the received data if an error is detected, and stores the analysis result in the second DVR memory 230.

The receive data buffer 240 stores data received by the data receive module 210 and the stored data is forwarded to the second network 600.

Here, the receive data buffer 240 is interfaced so that the second network 600 may read data from the receive data buffer 240 but cannot write data to the receive data buffer 240.

The second DVR memory 230 stores a DVR, which is a result of verification of data received by the data receive module 210.

The second DVR check module 250 examines the format of a DVR stored in the second DVR memory 230 for secure DVR transmission.

Here, the data receive module 210 is granted write-only permission for the second DVR memory 230 and the second DVR check module 250 is granted read-only permission for the second DVR memory 230.

As described above, the data receive module 210 and the second DVR check module 250 are only allowed to exchange data through the second DVR memory 230, and the second DVR check module 250 is only allowed to read from the second DVR memory 230 and the data receive module 210 is only allowed to write to the second DVR memory 230. Hence, the individual modules are allowed to operate independently.

In addition, the second DVR memory 230 is only allowed to store DVR information of a small fixed size, preventing a possibility of cyber attack through the second DVR memory 230.

The DVR transmit module 220 sends a DVR through the DVR transmit port 202 to the DVR transmission line 400 according to the result produced by the second DVR check module 250.

As described above, in the receiver 200, the data receive module 210 analyzes received data packets to detect occurrence of an error such as packet loss or bit error, discards the received data if an error is detected, and stores a DVR as the analysis result in the second DVR memory 230. Thereafter, the second DVR check module 250 examines possibility of cyber attack by examining the format of the DVR and the DVR transmit module 220 sends the DVR through the DVR transmission line 400 to the transmitter 100.

As such, to improve reliability of unidirectional data transmission, when the transmitter 100 sends a packet through the data transmission line 300 to the receiver 200, the receiver 200 sends a DVR indicating packet reception status through the DVR transmission line 400 to the transmitter 100. Hence, it is possible to detect occurrence of a packet error or bit error between the transmitter 100 and the receiver 200 and to perform retransmission, increasing reliability of unidirectional data delivery.

On the other hand, the operating system may be configured to block access to the first DVR check module 150, second DVR memory 230, DVR receive module 120 and DVR transmit module 220 of the transmitter 100 and receiver 200 so that data transmission through the receiver 200 to the first network 500 is not allowed. Hence, it is possible to achieve safe data delivery by blocking flow of information other than a DVR from the receiver 200 to the transmitter 100.

Figure 3:
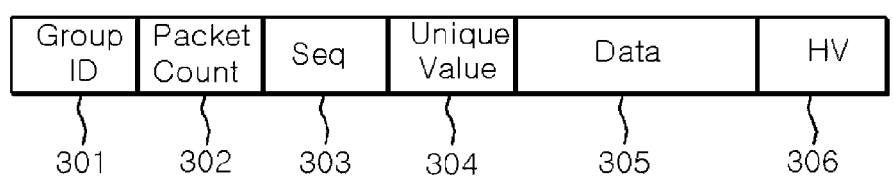
FIG. 3 illustrates the format of a data packet used in the unidirectional data transmission system according to the embodiment of the present invention.

FIG. 3 illustrates the format of a data packet used in the unidirectional data transmission system according to the embodiment of the present invention.

As shown in FIG. 3, to increase efficiency of data transmission, the data packet format is designed to support not only transmission of one packet and verification of reception but also transmission of a group of packets, and comprises a Group ID field 301, a Packet Count field 302, a Seq field 303, a Unique Value field 304, a Data field 305 and an HV field 306.

The Group ID field 301 stores a unique value indicating the group of packets to be sent.

The Packet Count field 302 indicates a packet to be sent in the packet group.

The Seq field 303 indicates the sequence of a packet to be sent in the packet group.

The Unique Value field 304 indicates a unique value used to resolve a problem that may occur during retransmission. Unique values are designed to distinguish individual packet transmissions. Sequential indexes or timestamps may be used as unique values.

The Data field 305 stores actual data to be sent.

The HV field 306 indicates a hash value. For efficiency of packet transmission, a CRC value may be used.

When a single packet is sent, the Packet Count field 302 and Seq field 303 may be omitted.

Figure 4:
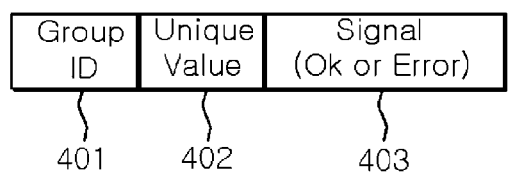
FIG. 4 illustrates the format of a data verification result used in the unidirectional data transmission system according to the embodiment of the present invention.

FIG. 4 illustrates the format of a data verification result used in the unidirectional data transmission system according to the embodiment.

As shown in FIG. 4, the DVR format to store a result of data verification comprises a Group ID field 401, a Unique Value field 402 and a Signal field 403.

The Group ID field 401 and Unique Value field 402 contain values of the packet group identical to those sent by the transmitter 100. The Group ID field 401 stores a unique value indicating the group of packets. The Unique Value field 402 indicates a unique value used to resolve a problem that may occur during retransmission, and unique values are designed to distinguish individual packet transmissions.

The Signal field 403 indicates a value of "OK" or "Error" according to the analysis result of received data packets. To minimize the size of a DVR packet sent by the receiver 200, one packet reception result may be sent for the whole group of received packets.

Figure 5:
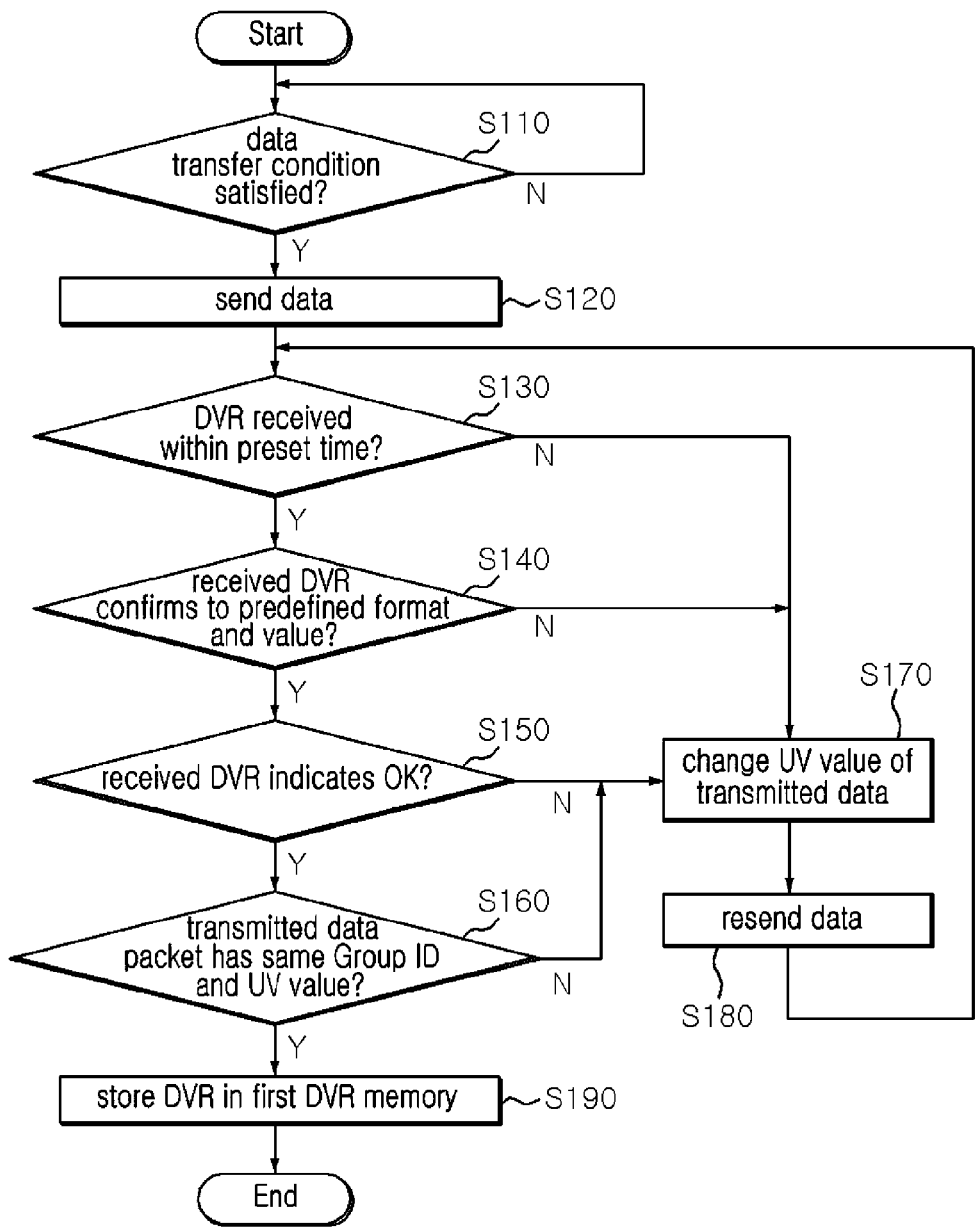
FIG. 5 is a flowchart of a procedure for data transmission in a unidirectional data transmission method according to one embodiment of the present invention.

FIG. 5 is a flowchart of a procedure for data transmission in a unidirectional data transmission method according to one embodiment of the present invention.

Referring to FIG. 5, for data transmission in the unidirectional data transmission method according to the embodiment of the present invention, in operation S110, the data transmit module 110 of the transmitter 100 determines whether a data transfer condition is satisfied.

The data transfer condition may be satisfied according to the status of a DVR stored in the first DVR memory 140 for the previous data or presence of data to be sent in the transmit data buffer 130.

If the data transfer condition is satisfied, in operation S120, the data transmit module 110 sends a group of data packets through the data transmission line 300.

After data transmission, in operation S130, the data transmit module 110 checks whether a DVR is received within a preset time through the DVR transmission line 400.

If a DVR is received, in operation S140, the data transmit module 110 checks whether the received DVR conforms to a predefined format and value, in operation S150, checks whether the received DVR indicates "OK", and, in operation S160, checks whether the received DVR has the same Group ID and UV value as the most recently sent data packet group.

If the received DVR indicates "OK" and has the same Group ID and UV value as the most recently sent data packet group, in operation S190, the data transmit module 110 confirms success of data transmission and stores the received DVR in the first DVR memory 140, permitting transmission of next data.

If the received DVR indicates "Error", in operation S170, the data transmit module 110 changes the UV value for retransmission so that the previous packet group to be resent has a different UV value from the previous packet group having been sent.

Here, when a response to a previously sent packet group arrives late, the UV value is used to check whether the response corresponds to the most recently sent packet group. After change of the UV value, in operation S120, the data transmit module 110 resends the previous data.

Figure 6:
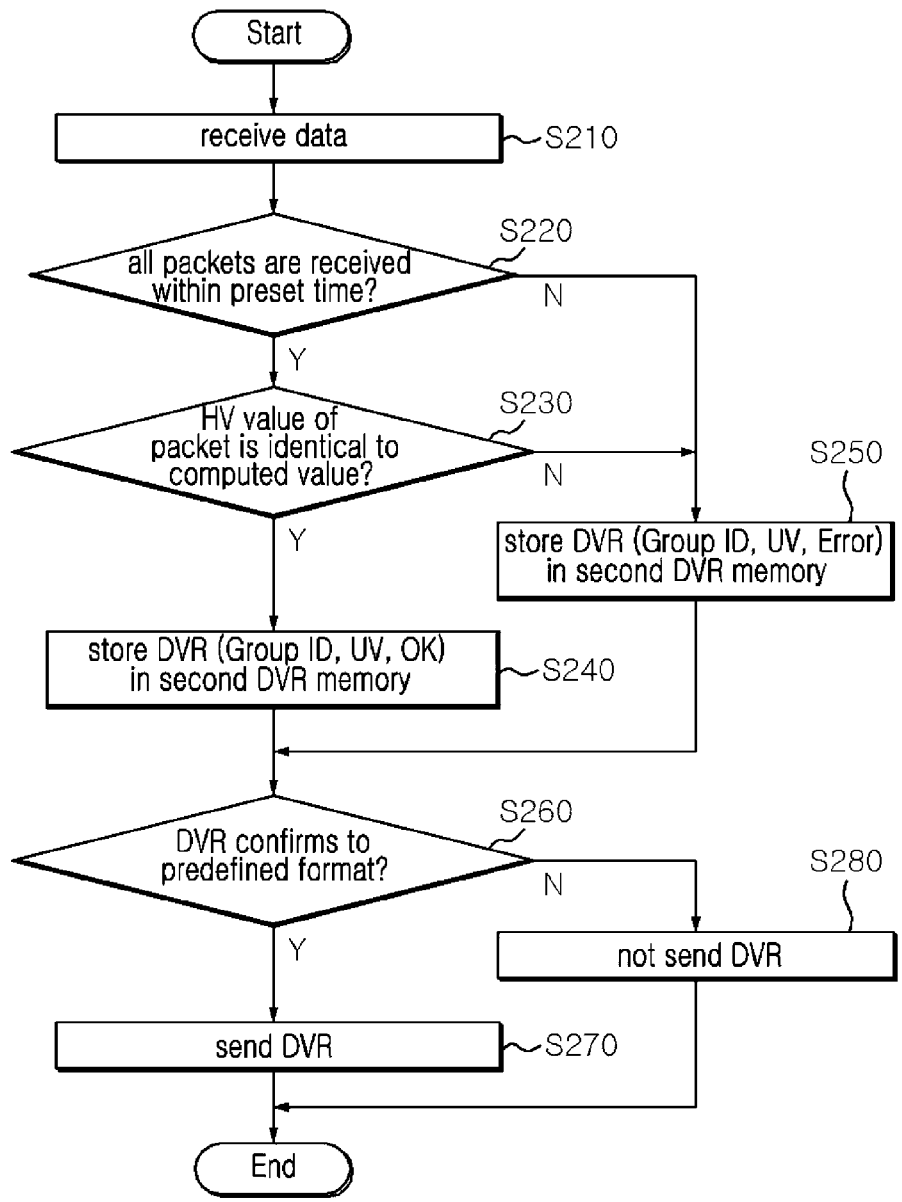
FIG. 6 is a flowchart of a procedure for data reception in the unidirectional data transmission method according to the embodiment of the present invention.

FIG. 6 is a flowchart of a procedure for data reception in the unidirectional data transmission method according to the embodiment of the present invention.

Referring to FIG. 6, for data reception in the unidirectional data transmission method according to the embodiment of the present invention, in operation S210, the data receive module 210 of the receiver 200 receives data through the data transmission line 300.

At operation S220, the data receive module 210 examines the Packet Count field and Seq field of the received data to check whether all packets have been received.

If all packets are received as indicated, in operation S230, the data receive module 210 compares the value of the HV field of the received data with a computed hash value to check occurrence of a data error.

If no error is detected, in operation S240, the data receive module 210 generates a DVR indicating "OK" and stores the DVR in the second DVR memory 230, and, in operation S270, sends the DVR through the DVR transmission line 400 to the transmitter 100.

If all packets are not received or an error is detected (the received hash value is not the same as the computed hash value), in operation S250, the data receive module 210 generates a DVR indicating "Error" and stores the DVR in the second DVR memory 230, and, in operation S270, sends the DVR to the transmitter 100 through the DVR transmission line 400.

Before DVR transmission, in operation S260, the DVR transmit module 220 checks whether the DVR stored in the second DVR memory 230 conforms to the predefined format, and, in operation S280, does not send the DVR if it does not conform to the predefined format.

Although some embodiments of the present invention have been described with reference to the drawings, it should be understood by those skilled in the art that various modifications and changes can be made without departing from the spirit and scope of the present invention as defined in the appended claims and their equivalents.

The invention claimed is:

1. A system for unidirectional data transmission, comprising:
   a transmitter that is connected to a first network having a higher security level, sends data coming from the first network through a data transmission line to a second network having a lower security level, and receives a data verification result (DVR) corresponding to the data through a DVR transmission line; and
   a receiver that is connected to the second network having a lower security level, receives data from the transmitter through the data transmission line and forwards the received data to the second network, and sends a DVR corresponding to the received data through the DVR transmission line.

2. The system according to claim 1, wherein the transmitter comprises:
   a transmit data buffer to store data received from the first network;
   a data transmit module to send data stored in the transmit data buffer via a data transmit port to the data transmission line;
   a DVR receive module to receive a DVR transmitted to the DVR transmission line via a DVR receive port through;
   a first DVR check module to examine the format of a DVR received by the DVR receive module; and
   a first DVR memory to store the received DVR according to the result of checking by the first DVR check module.

3. The system according to claim 2, wherein the data transmit module determines to send the next data or to resend the previous data in accordance with the status of the DVR stored in the first DVR memory.

4. The system according to claim 2, wherein the first DVR check module is granted write-only permission for the first DVR memory and the data transmit module is granted read-only permission for the first DVR memory.

5. The system according to claim 1, wherein the transmitter is connected with the first network so that data can flow only from the first network to the transmitter.

6. The system according to claim 1, wherein the receiver comprises:
   a data receive module to receive data transmitted to the data transmission line through a data receive port;
   a receive data buffer to store data received by the data receive module and forward the stored data to the second network;
   a second DVR memory to store a DVR as a result of verification of data received by the data receive module;
   a second DVR check module to examine the format of the DVR stored in the second DVR memory; and
   a DVR transmit module to send the DVR through a DVR transmit port to the DVR transmission line in accordance with the result produced by the second DVR check module.

7. The system according to claim 6, wherein the data receive module is granted write-only permission for the second DVR memory and the second DVR check module is granted read-only permission for the second DVR memory.

8. The system according to claim 1, wherein the receiver is connected with the second network so that data can flow only from the receiver to the second network.

9. The system according to claim 1, wherein a data packet to be sent through the data transmission line comprises a Group ID field to store a unique value of a data packet group, a Packet Count field to indicate a packet to be sent in the data packet group, a Seq field to indicate the sequence of the packet to be sent in the data packet group, a Unique Value field to store a unique value used to distinguish each packet transmission, a Data field to store actual data to be sent, and an HV field to store a hash value of the data packet.

10. The system according to claim 1, wherein a DVR packet to be sent through the DVR transmission line comprises a Group ID field to store a unique value indicating a corresponding data packet group, a Unique Value field to store a unique value used to distinguish each packet transmission, and a Signal field to store the analysis result of received data.

11. The system according to claim 1, wherein the data transmission line is physically separate from the DVR transmission line.

12. A method for unidirectional data transmission, comprising:
    checking, by a transmitter, whether a data transfer condition is satisfied;
    sending data through a data transmission line, when the data transfer condition is satisfied;
    checking whether a data verification result (DVR) is received within a preset time after data transmission through a DVR transmission line;
    determining whether to resend the data depending upon the status of the DVR; and
    resending the data with a modified first value for packet discrimination or storing the DVR according to the result of determination.

13. The method according to claim 12, wherein the data transfer condition corresponds to the status of the DVR or to presence of data to be sent in a transmit data buffer.

14. The method according to claim 12, wherein determining whether to resend the data comprises:
    checking whether the DVR is received within a preset time;
    checking whether the received DVR conforms to a predefined format and value;
    checking whether the received DVR indicates success of verification; and
    checking whether the received DVR has the same Group ID and first value as the corresponding data packet.

15. The method according to claim 12, wherein the data transmission line is physically separate from the DVR transmission line.

16. A method for unidirectional data transmission, comprising:
    receiving data through a data transmission line by a receiver;
    checking whether a data packet is normally received;
    storing a data verification result (DVR) corresponding to the result of normal reception checking; and
    examining the stored DVR and sending the same through a DVR transmission line.

17. The method according to claim 16, wherein checking whether a data packet is received normally comprises:
    examining whether all packets of the data packet are received within a preset time; and
    examining whether a hash value of the data packet is identical to a computed hash value.

18. The method according to claim 16, wherein the data transmission line is physically separate from the DVR transmission line.

* * * * *